(12) United States Patent
Mottola

(10) Patent No.: US 8,769,850 B1
(45) Date of Patent: Jul. 8, 2014

(54) MEDALLION DISPLAY APPARATUS FOR MOTORCYCLES

(76) Inventor: John David Mottola, St. Cloud, FL (US)

( * ) Notice: Subject to any disclaimer, the term of this patent is extended or adjusted under 35 U.S.C. 154(b) by 0 days.

(21) Appl. No.: 13/486,392

(22) Filed: Jun. 1, 2012

Related U.S. Application Data

(63) Continuation-in-part of application No. 12/783,461, filed on May 19, 2010, now Pat. No. 8,429,840.

(60) Provisional application No. 61/492,244, filed on Jun. 1, 2011.

(51) Int. Cl.
  *G09F 21/04* (2006.01)
  *B60R 13/00* (2006.01)

(52) U.S. Cl.
  CPC ............. *G09F 21/048* (2013.01); *B60R 13/005* (2013.01)
  USPC ........................................................... 40/590

(58) Field of Classification Search
  CPC .......................... G09F 21/048; B60R 13/005
  USPC ....................... 40/590, 643, 661.05
  See application file for complete search history.

(56) References Cited

U.S. PATENT DOCUMENTS

| | | | | |
|---|---|---|---|---|
| 3,678,705 | A * | 7/1972 | Korwin | 63/18 |
| 4,879,826 | A * | 11/1989 | Wittke | 40/551 |
| 6,190,026 | B1* | 2/2001 | Moore | 362/487 |
| 2005/0167176 | A1* | 8/2005 | Kruse | 180/291 |
| 2009/0000170 | A1* | 1/2009 | Capuzzi | 40/643 |
| 2011/0052839 | A1* | 3/2011 | Pierce et al. | 428/31 |

* cited by examiner

*Primary Examiner* — Kristina Junge
(74) *Attorney, Agent, or Firm* — The Miller Law Offices PLC; Steven J. Miller, Esq.

(57) ABSTRACT

A display apparatus for a medallion, challenge coin, or the like, provides a generally circular or other shape holder with an integral recess on the front surface thereof for receiving and retaining the medallion for display. The rear surface of the mount is preferably secured to the desired mounting surface by adhesive, and may includes a reservoir for the adhesive material in the form of a pair of arcuate channels. The display apparatus may be installed on a variety of surfaces, including several locations on a motorcycle, by shaping the rear surface of the mount to correspond to the shape of the surface of the desired mounting location.

15 Claims, 3 Drawing Sheets

MEDALLION DISPLAY APPARATUS FOR MOTORCYCLES

CROSS REFERENCE TO RELATED APPLICATIONS

The present application is a continuation-in-part of copending application Ser. No. 12/783,461, filed May 19, 2010, and claims the benefit of the filing date of U.S. Provisional Patent Application Ser. No. 61/492,244, filed Jun. 1, 2011. The foregoing applications are incorporated by reference in their entirety as if fully set forth herein.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to holders and displays for decorative articles, and more particularly to an improved apparatus for displaying medallions, challenge coins, and related articles on motorcycles and the like.

BACKGROUND INFORMATION AND DISCUSSION OF RELATED ART

U.S. Pat. No. 5,424,137 to Stagl discloses a sportsball and medallion holder which comprises a first hemisphere and a second hemisphere of similar diameter, each hemisphere having a circular edge in abutment along a parting line to form a hollow sphere. A slot is formed in the sphere on the parting line and extends inwardly from an outer surface through the wall of the sphere. A medallion holder includes a mounting having an outer surface whereon a medallion is fastened, and a plate for engaging the sphere, the plate being connected transversely to the mounting by a first portion having a cross-section that fits in the slot. The sportsball and medallion holder are assembled with the hemispheres forming a sphere and the mounting means for a medallion located outside the sphere with the first portion being retained in the slot. Edges of the hemispheres fit congruently into notches in the plate.

U.S. Pat. No. 6,752,119 Coleman describes a removable timing chain cover mounted to a fixed frame. The removable cover may contain a harmonic balancer seal retainer for quickly replacing the harmonic balancer seal and a removable cam timing cover for adjusting the cam timing. A timing marker may be positioned for different harmonic balancer sizes as well as being circumferentially adjustable for precise positioning. Further, a timing chain tensioner may be mounted to the frame.

U.S. Pat. No. 6,805,213 Seffernick, et al. teaches a grille for a motor vehicle which provides a port giving access to the cooling system surge tank. The port is closed by a cover which is removable and replaceable without the use of tools. The cover can carry on an outside face a badge or medallion of the manufacturer. While the cover is removable from the frame in the grille, theft is discouraged by a cord connected between the cover and the vehicle itself. Cutting or breaking the cord does not result in damage to the grille.

U.S. Pat. No. 7,237,683 to Hammers discloses a display device for displaying coins, medals and medallions. The display device is designed to focus the viewer's attention on the object on display without blocking a substantial portion of the object from the view. Additionally, that invention provides a display device suitable for displaying a coin, medal or medallion along with a related secondary object. Finally, that invention provides a device suitable for display a plurality of coins, medals or medallions.

U.S. Pat. No. 7,437,840 to Ratmansky, et al. describes a memorabilia apparatus in which indicia are imprinted on a medallion using convention minting technology. An ice hockey puck or a model of a tire has a cavity adapted to receive and to support the medallion for display. The cavity of the puck or model of a tire exerts a pre-selected force upon the medallion over a pre-selected area, holding the medallion in place during handling while allowing a collector to release the medallion from the puck or model of the tire. Alternatively, resilient or spring retaining members releasably engage the puck or model of the tire and the medallion.

U.S. Pat. D455,375 and D609,611 to Johnson teach designs for a floorboard timing cover and exhaust guard for a motorcycle.

The foregoing patents reflect the current state of the art of which the present inventor is aware. Reference to, and discussion of, these patents is intended to aid in discharging Applicant's acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

SUMMARY OF THE INVENTION

The present invention provides a display apparatus for a medallion, challenge coin, or the like, in the form of a generally circular or other shape holder or mount with an integral recess or socket on the front surface thereof (as in the form of a shallow counterbore) for receiving and retaining the medallion for display. The rear surface of the mount is preferably secured to the desired mounting surface by adhesive such as RTV silicone, or by other means. In a preferred embodiment, the rear surface of the mount includes a reservoir for the adhesive material that may be in the form of a pair of arcuate channels, which can be filled with the adhesive and the mount then placed on the mounting surface. An aperture may be formed through the center of the socket to permit release of excess adhesive from the rear surface. After the mount has been installed on the mounting surface, a medallion or coin can be secured in the mount with RTV silicone or other adhesive, or other mounting methods. The medallion can be subsequently removed from the mount by inserting a tool through a slot formed in the circumferential edge of the holder, and prying the medallion from the socket.

The inventive display apparatus may be installed on a variety of surfaces, including several locations on a motorcycle, by shaping the rear surface of the mount to correspond to the shape of the surface of the desired mounting location. For example, a first embodiment of the apparatus has a concave wedge-shaped rear surface to mate with the outside surface of a stock horn cover on Harley-Davidson motorcycles. A second embodiment of the apparatus has a concave spherical rear surface with a specific radius of curvature corresponding to the outside surface of a stock fuel door on Harley-Davidson motorcycles. A third embodiment of the apparatus has a concave spherical rear surface with a different specific radius of curvature corresponding to the outside surface of a primary cover on Harley-Davidson motorcycles. Other rear surface curvatures or shapes can be implemented as appropriate to correspond to the shape of any mounting surface. A fourth embodiment of the apparatus has a flat rear surface for "universal" mounting on any flat mounting surface. This universal mount or the other mounts may also include one or more screw holes through the rear of the socket to enable installation with screws or other fasteners. These embodiments may also include a countersunk center bore so that they may be mounted on the outside surface of a stock air cleaner on Harley-Davidson motorcycles, by removing the stock fastener and replacing it with an aftermarket countersunk-type screw or other fastener.

The inventive display mount does not damage the motorcycle or other object to which it is mounted in any way. Even when installed, the apparatus does not impede the air flow over the engine, hamper engine cooling, or otherwise interfere with the operation of the motorcycle. For most installations, especially on current motorcycle models, no modifications are necessary, and no drilling is required.

The display apparatus is preferably constructed of 6061 aircraft aluminum or similar material. Various finishes may be used, including polished chrome, powder coating, anodizing, or custom paint. The outside surface of the mount may optionally include angles, cutouts, scallops, custom edges such as rounded or beveled, notches, chamfers, tooling, inclined surfaces, flats, or other surface features.

The mount may be used as a display apparatus for medallions (such as professional or service medallions), challenge coins, personal pieces, and the like. Such articles are often 1¾ inches or 1½ inches in diameter, though other sizes are also contemplated in the scope of this invention. The integral recess of the inventive display apparatus may be constructed in any size to accommodate any sized piece.

The inventive apparatus thus provides a display apparatus for medallions and the like that is light, durable, and rigid, and can withstand heat and adverse weather conditions. When properly installed, the medallion will not inadvertently fall out of the mount, even at high speeds or in high temperatures.

It is therefore an object of the present invention to provide a new and improved display apparatus for medallions, challenge coins, and the like.

It is another object of the present invention to provide a new and improved apparatus that may be mounted to a motorcycle, car, boat, or other object to display medallions or the like.

A further object or feature of the present invention is a new and improved medallion display apparatus that does not damage the motorcycle or object to which it is mounted in any way, does not impede the air flow over the engine, or hamper engine cooling.

An even further object of the present invention is to provide a novel display apparatus can be easily removed from the motorcycle or object when it is desired to return the motorcycle or object to stock condition.

Other novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
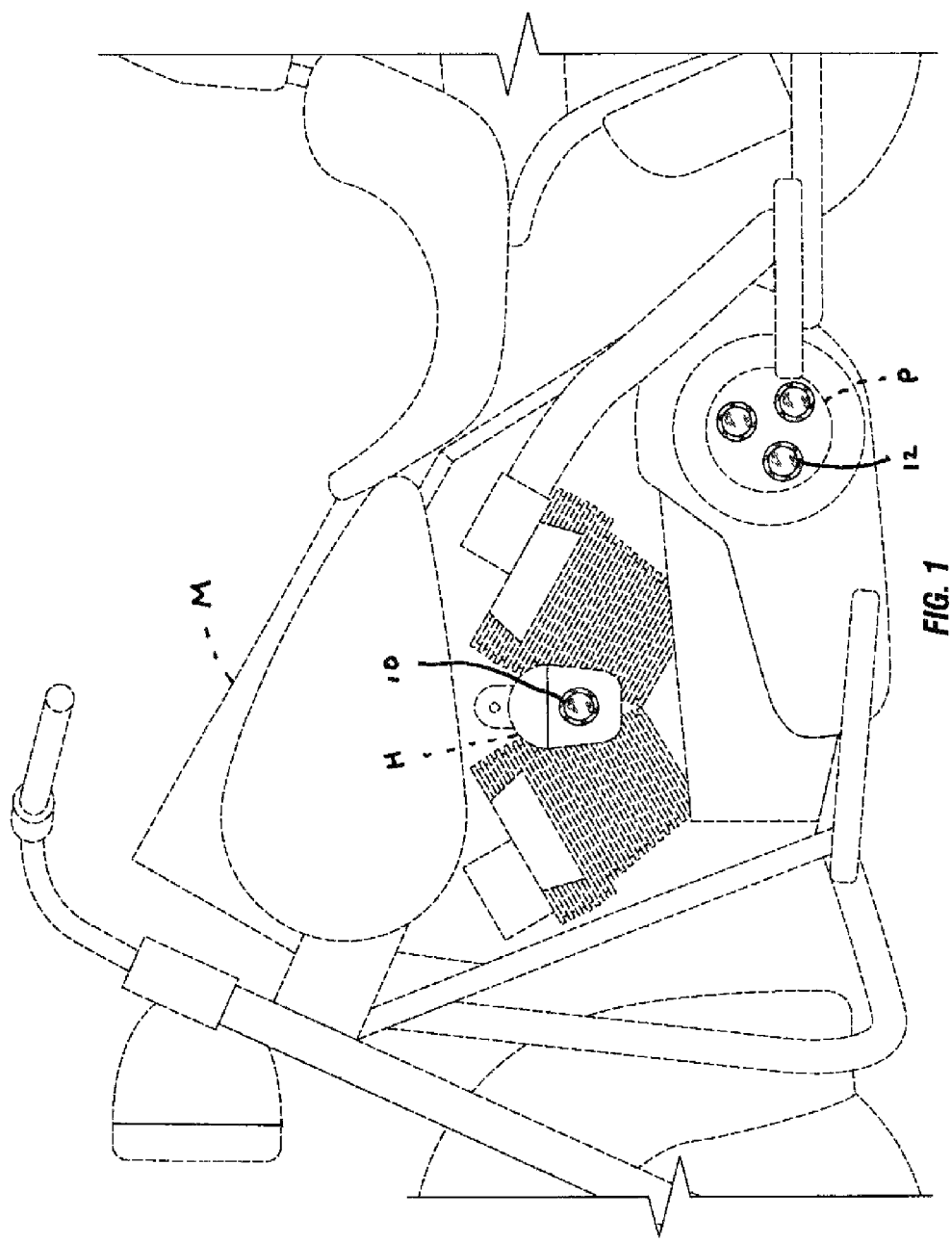
FIG. 1 is a view of a horn cover embodiment and a primary cover embodiment of the medallion display apparatus of this invention as mounted on a motorcycle.

Referring to FIGS. 1 through 7, wherein like reference numerals refer to like components in the various views, there is illustrated therein a new and improved medallion display apparatus for motorcycles or other objects.

FIG. 1 is a view of a horn cover display apparatus 10 as mounted on the horn cover H of a motorcycle M, and a series of three primary cover display apparatus 12 as mounted on the primary cover P of the motorcycle.

Figure 2:
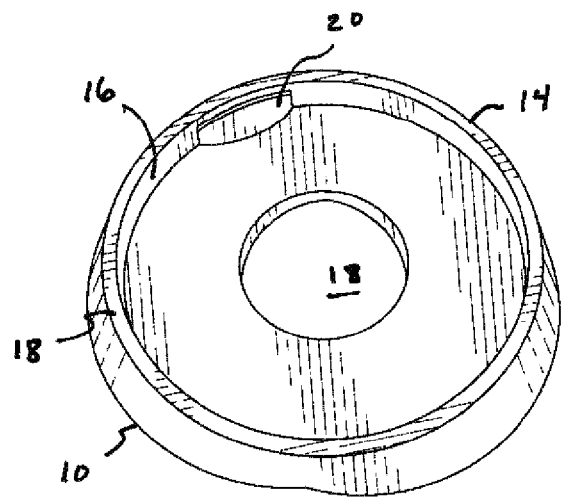
FIG. 2 is a front perspective view of the horn cover embodiment.

FIG. 2 is a front perspective view of the horn cover display apparatus 10, illustrating the holder body 14 having an integral recess 16 on a front surface 18 thereof. Aperture 18 may be formed through the center of the recess to permit release of excess adhesive from the rear surface. Slot 20 formed in the circumferential edge of the recess may be utilized to remove a medallion after installation.

Figure 3:
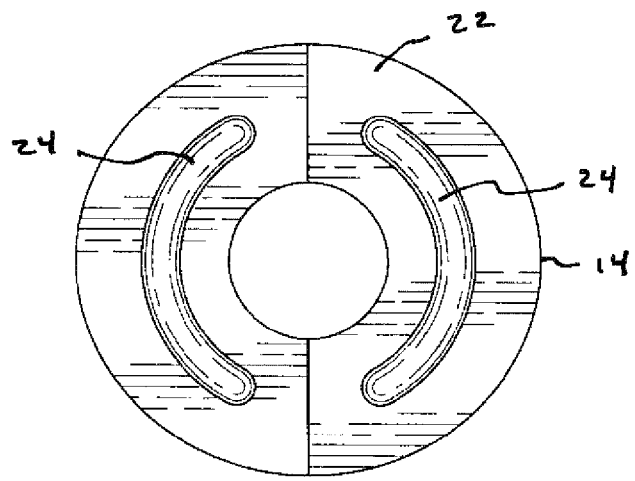
FIG. 3 is a rear elevation view of the horn cover embodiment.

FIG. 3 is a rear elevation view of the horn cover display apparatus 10, illustrating the concave, wedge-shaped rear surface 22 corresponding to the wedge shape of the horn cover to which it is to be attached. Arcuate channels 24 provide reservoirs for the adhesive used to secure the apparatus to the horn cover mounting surface.

Figure 4:
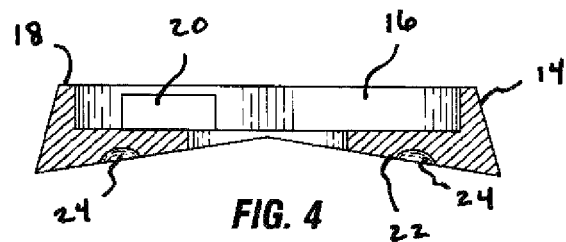
FIG. 4 is a side elevation cross-sectional view of a horn cover embodiment.

FIG. 4 is a side elevation cross-sectional view of the horn cover display apparatus 10, better illustrating the concave, wedge-shaped rear surface 22.

Figure 5:
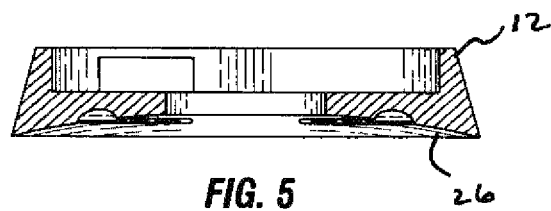
FIG. 5 is a side elevation cross-sectional view of a primary cover embodiment.

FIG. 5 is a side elevation cross-sectional view of a primary cover display apparatus 12, illustrating the concave spherical rear surface 26, corresponding to the radius of curvature of the outside surface of a primary cover on Harley-Davidson motorcycles. A slightly different radius of curvature may be implemented to correspond to the outside surface of a stock fuel door on Harley-Davidson motorcycles. Other rear surface curvatures or shapes can be implemented as appropriate to correspond to the shape of any mounting surface to which the apparatus is to be applied. In addition, the outside surface of any of these may be modified. For example, the fuel door embodiment may benefit aesthetically from a rounded top edge or beveled top edge, or other design.

Figure 6:
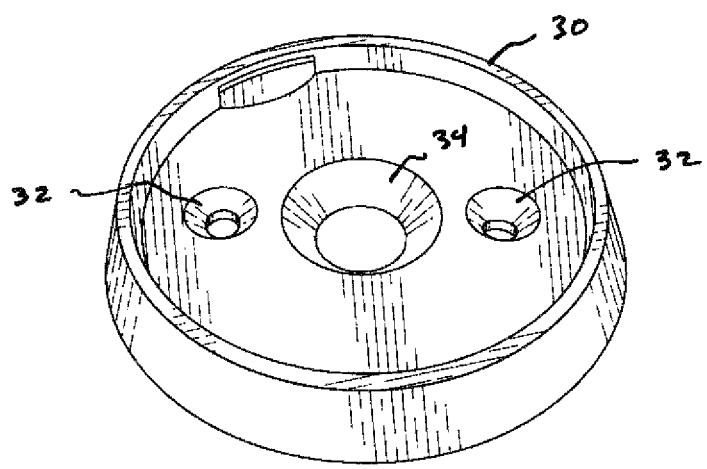
FIG. 6 is a front perspective view of a universal embodiment.

FIG. 6 is a front perspective view of a universal display apparatus 30, including screw holes 32 through the rear of the recess to enable installation of the mount with screws or other fasteners. A countersunk center bore 34 enable the apparatus to be mounted on the outside surface of a stock air cleaner on Harley-Davidson motorcycles, by removing the stock fastener and replacing it with an aftermarket countersunk-type screw or other fastener.

Figure 7:
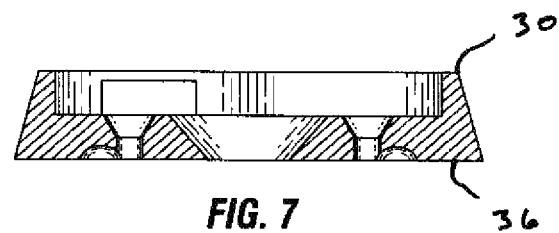
FIG. 7 is a side elevation cross-sectional view of the universal embodiment.

FIG. 7 is a side elevation cross-sectional view of the universal display apparatus 30, illustrating the flat rear surface 36 for "universal" mounting on any flat mounting surface. Alternatively, the universal display apparatus may utilize a concave spherical rear surface, or any other shape, particularly if it is to be mechanically affixed to a mounting surface with screws or other fasteners.

The recess or socket may consist of a shallow (e.g., 0.156 inches) recess in the center of the mount, and may be 1.795 inches in diameter for a typical 1¾ inch medallion (also common 1½ inch medallions may use this or a narrower diameter recess). Other shapes, recess depth and width dimensions may be used as necessary to accommodate the dimensions of the particular medallion to be mounted and displayed.

The following are typical mounting instructions for the display apparatus:

1. Purchase a tube of high temperature RTV Silicone gasket maker (e.g., ultra black) from your local auto parts store.
2. Clean off the mounting surface with alcohol and remove all dirt.
3. Place the mount on the mounting surface for fit, with the slot facing in an accessible direction. Make note of the position, and make sure it doesn't interfere with anything on or near the mounting location.
4. Apply one bead of RTV silicone in each of the channels on the underside of the mount. Do not overfill the channels—this will cause excessive overflow.
5. With the slot facing the desired orientation, place the mount on the mounting surface and press down easily, making sure the sides of the mount lies flat all the way around, and along all edges. Do not move the mount around—this will cause the silicone to smear. If it smears, allow it to dry and peel off later with a straw end or something non-abrasive.
6. Use masking tape to steady the mount from moving.
7. Allow the silicone to cure overnight at least 9-12 hours.
8. Next day mount the medallion by putting two dabs of RTV silicone about ½ dime size at the 3 and 9 o'clock positions. Make sure the bottom slot is clear of RTV silicone. (This slot will be used to remove your coin.)
9. Center your medallion in and wait 7-8 hours or more for the RTV to cure.

Medallion removal instructions: Place a very small thin screw driver in the slot and pry the medallion out. You may have to use another screw driver once it loosens up to help remove the medallion. Be careful not to damage the mount when inserting the screw driver in the slot. Just twist a little and the medallion should loosen up, then pop it out. Clean out the silicone, using a non sharp tool. The mount is ready to accept another medallion, as described above.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed is:

1. An apparatus for the display of a medallion, said apparatus comprising:
    a generally circular body portion having a front surface and a rear surface, an integral recess on said body portion front surface for receiving and retaining a medallion for display,
    said body portion rear surface having a reservoir for filling with an adhesive material for securing said body portion to any desired mounting surface on a motorcycle,
    said integral recess includes an aperture to permit release of excess adhesive from said body portion rear surface reservoir,
    said medallion being inserted and secured to said body portion front surface integral recess.

2. The apparatus of claim 1, wherein said reservoir comprises the form of a pair of arcuate channels which can be filled with adhesive.

3. The apparatus of claim 2, wherein said apparatus is adapted to be mounted onto components of a car, boat, and other object to display said medallion.

4. The apparatus of claim 1 wherein said integral recess includes a circumferential edge bearing a slot to facilitate removal of a medallion.

5. The apparatus of claim 4, wherein said apparatus is adapted to be mounted onto components of a car, boat, and other object to display said medallion.

6. The apparatus of claim 1 wherein said rear surface comprises a concave wedged-shaped rear surface to mate with the outside surface of a horn cover.

7. The apparatus of claim 1 wherein said rear surface comprises a concave spherical rear surface with a specific radius of curvature corresponding to the outside surface of a stock fuel door on a motorcycle.

8. The apparatus of claim 1 wherein said rear surface comprises a concave spherical rear surface with a specific radius of curvature corresponding to the outside surface of a primary cover on a motorcycle.

9. The apparatus of claim 1 wherein said rear surface comprises a flat rear surface for mounting on any flat mounting surface.

10. The apparatus of claim 9 wherein said integral recess includes one or more screw holes to enable installation with screws.

11. The apparatus of claim 10, wherein said apparatus is adapted to be mounted onto components of a car, boat, and other object to display said medallion.

12. The apparatus of claim 9 wherein said integral recess includes a countersunk center bore so that it may be mounted on the outside surface of an air cleaner.

13. The apparatus of claim 9, wherein said apparatus is adapted to be mounted onto components of a car, boat, and other object to display said medallion.

14. The apparatus of claim 1, wherein said apparatus is adapted to be mounted onto components of a car, boat, and other object to display said medallion.

15. The apparatus of claim 1 wherein the adhesive is Room Temperature Vulcanizing silicon.

\* \* \* \* \*